US012633074B2

(12) United States Patent
Lee et al.

(10) Patent No.: US 12,633,074 B2
(45) Date of Patent: May 19, 2026

(54) ELECTRONIC DEVICE INTERLOCKED WITH ENDOSCOPE TO PERFORM ENDOSCOPIC EXAMINATION AND METHOD FOR PERFORMING ENDOSCOPIC EXAMINATION USING THE SAME

(71) Applicant: THE CATHOLIC UNIVERSITY OF KOREA INDUSTRY-ACADEMIC COOPERATION FOUNDATION, Seoul (KR)

(72) Inventors: Bo-in Lee, Cheonan-si (KR); Youngbae Hwang, Cheongju-si (KR); Sol Kim, Seoul (KR); Saad Khalil, Cheongju-si (KR)

(73) Assignee: THE CATHOLIC UNIVERSITY OF KOREA INDUSTRY-ACADEMIC COOPERATION FOUNDATION, Seoul (KR)

( * ) Notice: Subject to any disclaimer, the term of this patent is extended or adjusted under 35 U.S.C. 154(b) by 128 days.

(21) Appl. No.: 18/642,950

(22) Filed: Apr. 23, 2024

(65) Prior Publication Data

US 2024/0386686 A1    Nov. 21, 2024

(30) Foreign Application Priority Data

May 18, 2023    (KR) ........................ 10-2023-0064668

(51) Int. Cl.
G06T 19/20        (2011.01)
G06T 7/579        (2017.01)
(Continued)

(52) U.S. Cl.
CPC .............. G06T 19/20 (2013.01); G06T 7/579 (2017.01); G06V 10/44 (2022.01); G06V 10/764 (2022.01);
(Continued)

(58) Field of Classification Search
CPC ...................... G06T 19/20; G06T 2207/10068
(Continued)

(56) References Cited

U.S. PATENT DOCUMENTS

| 2009/0010507 A1* | 1/2009 | Geng ...................... G06T 7/593 |
| | | 382/128 |
| 2017/0046833 A1* | 2/2017 | Lurie ...................... G06T 17/20 |

(Continued)

FOREIGN PATENT DOCUMENTS

| KR | 20110068153 | 6/2011 |
| KR | 20160071241 | 6/2016 |
| KR | 20170010573 | 2/2017 |

OTHER PUBLICATIONS

Office Action issued in corresponding Korean Application No. 10-2023-0064668, dated Jan. 23, 2025. (Korean Only).

*Primary Examiner* — Samantha (Yuehan) Wang
(74) *Attorney, Agent, or Firm* — NORTON ROSE FULBRIGHT US LLP

(57) ABSTRACT

The method for performing endoscopic examination according to an exemplary embodiment of the present invention may include the steps of obtaining an endoscopic image and a 3D model of a target organ; identifying location information of an endoscope on the 3D model in real time based on simultaneous localization and mapping (SLAM); classifying a plurality of areas constituting the 3D model into examination areas and unexamined areas by using the endoscopic image and the location information; and providing feedback information based on the examination areas and unexamined areas.

14 Claims, 5 Drawing Sheets

(51) Int. Cl.
*G06V 10/44* (2022.01)
*G06V 10/764* (2022.01)

(52) U.S. Cl.
CPC ............... *G06T 2207/10068* (2013.01); *G06T 2207/30168* (2013.01); *G06T 2219/2004* (2013.01)

(58) Field of Classification Search
USPC ......................................................... 345/419
See application file for complete search history.

(56) References Cited

U.S. PATENT DOCUMENTS

2018/0060491 A1* 3/2018 Kikuchi ................. G16H 15/00
2023/0267679 A1* 8/2023 Liu .......................... G06T 19/00
345/419

* cited by examiner

1

ELECTRONIC DEVICE INTERLOCKED WITH ENDOSCOPE TO PERFORM ENDOSCOPIC EXAMINATION AND METHOD FOR PERFORMING ENDOSCOPIC EXAMINATION USING THE SAME

CROSS-REFERENCE TO RELATED APPLICATION

This application claims priority to and the benefit of Korean Patent Application No. 10-2023-0064668, filed on May 18, 2023, the disclosure of which is incorporated herein by reference in its entirety.

FIELD OF THE DISCLOSURE

The present invention relates to an electronic device which is interlocked with an endoscope to perform endoscopic examination, and a method for performing endoscopic examination using the same.

BACKGROUND ART

Endoscopic examination is mainly a procedure for identifying symptoms of the gastrointestinal tract, and by detecting and removing pre-existing lesions through endoscopic examination, the incidence and mortality of cancer can be reduced.

However, in the case of endoscopic examination, the accuracy of the examination may vary depending on the examiner's proficiency, technique, observation time, gastrointestinal cleanliness and the like. In addition, the examination results may vary depending on physiological phenomena that occur during the examination.

For this reason, even though endoscopic examination is performed at an appropriate time, pre-cancerous lesions or early cancers may not be detected and overlooked, resulting in an unfortunate incident of developing cancer.

Therefore, it is necessary to prepare a method capable of stably and precisely performing endoscopic examination regardless of factors that degrade the quality of endoscopic examination, such as the proficiency of the examiner and the like.

SUMMARY

An object of the present invention is to provide an electronic device which is capable of more stably and precisely performing endoscopic examination, and a method for performing endoscopic examination using the same.

The method for performing endoscopic examination may include the steps of obtaining an endoscopic image and a 3D model of a target organ; identifying location information of an endoscope on the 3D model in real time based on simultaneous localization and mapping (SLAM); classifying a plurality of areas constituting the 3D model into examination areas and unexamined areas by using the endoscopic image and the location information; and providing feedback information based on the examination areas and unexamined areas.

The step of obtaining may include a step of constructing the 3D model in real time by using the endoscopic image based on simultaneous localization and mapping (SLAM)

The step of obtaining may include a step of acquiring a 3D model generated based on any one of SfM (Structure from Motion), MvS (Multi-view Stereo), CT (Computed Tomography) and a 3D sensor.

The step of classifying examination areas and unexamined areas may include the steps of identifying candidate examination areas among a plurality of areas of the 3D model based on the location information; determining whether an examination is performed for each of the candidate examination areas; and classifying the plurality of areas into the examination areas and the unexamined areas based on the determination result.

The step of determining whether an examination is performed may include a step of determining whether the examination is performed based on at least one of the importance of each area of the 3D model, an observation time for each area and the quality of the endoscopic image.

The step of determining whether an examination is performed may include a step of determining whether the examination is performed by using a model which is learned to determine whether the examination is performed based on at least one of the importance of each area of the 3D model, an observation time for each area and the quality of the endoscopic image.

The step of providing feedback information may include a step of providing at least one of information about the examination path of the endoscope and information about the unexamined areas.

The step of obtaining may include the steps of constructing a first 3D model in real time by using the endoscopic image based on the simultaneous localization and mapping; and obtaining the 3D model by registering a second 3D model generated based on any one of SfM (Structure from Motion), MvS (Multi-view Stereo), CT (Computed Tomography) and a 3D sensor with the first 3D model.

The step of matching may include the steps of extracting features of the first 3D model and the second 3D model; and matching the first 3D model and the second 3D model by matching the extracted features.

The electronic device which is interlinked with an endoscope to perform endoscopic examination may include a processor which obtains an endoscopic image and a 3D model of a target organ, identifies location information of an endoscope on the 3D model in real time based on simultaneous localization and mapping (SLAM), classifies a plurality of areas constituting the 3D model into examination areas and unexamined areas by using the endoscopic image and the location information, and provides feedback information based on the examination areas and unexamined areas.

The processor may construct the 3D model in real time by using the endoscopic image based on simultaneous localization and mapping (SLAM).

The processor may acquire a 3D model generated based on any one of SfM (Structure from Motion), MvS (Multiview Stereo), CT (Computed Tomography) and a 3D sensor.

The processor may identify candidate examination areas among a plurality of areas of the 3D model based on the location information, determine whether an examination is performed for each of the candidate examination areas, and classify the plurality of areas into the examination areas and the unexamined areas based on the determination result.

The processor may determine whether the examination is performed based on at least one of the importance of each area of the 3D model, an observation time for each area and the quality of the endoscopic image.

The processor may determine whether the examination is performed by using a model which is learned to determine whether the examination is performed based on at least one of the importance of each area of the 3D model, an observation time for each area and the quality of the endoscopic image.

The processor may provide at least one piece of feedback information among information about the examination path of the endoscope and information about the unexamined areas.

The processor may construct a first 3D model in real time by using the endoscopic image based on the simultaneous localization and mapping, and obtain the 3D model by registering a second 3D model generated based on any one of SfM (Structure from Motion), MvS (Multi-view Stereo), CT (Computed Tomography) and a 3D sensor with the first 3D model.

The processor may extract features of the first 3D model and the second 3D model, and matches the first 3D model and the second 3D model by matching the extracted features.

According to an exemplary embodiment of the present invention, endoscopic examination areas/unexamined areas may be identified in comparison to the entire area, thereby increasing a lesion detection rate in endoscopic examination and minimizing a lesion overlook rate.

According to an exemplary embodiment of the present invention, it is possible to provide a highly reliable endoscope precision examination service regardless of the skill level of an examiner.

According to an exemplary embodiment of the present invention, when the ratio of the examination area to the total area is low or the area of high importance is overlooked by referring to the feedback information, the examiner takes follow-up measures such as re-examination, thereby increasing the tumor detection rate through endoscopic examination.

DETAILED DESCRIPTION OF THE INVENTION

Figure 1:
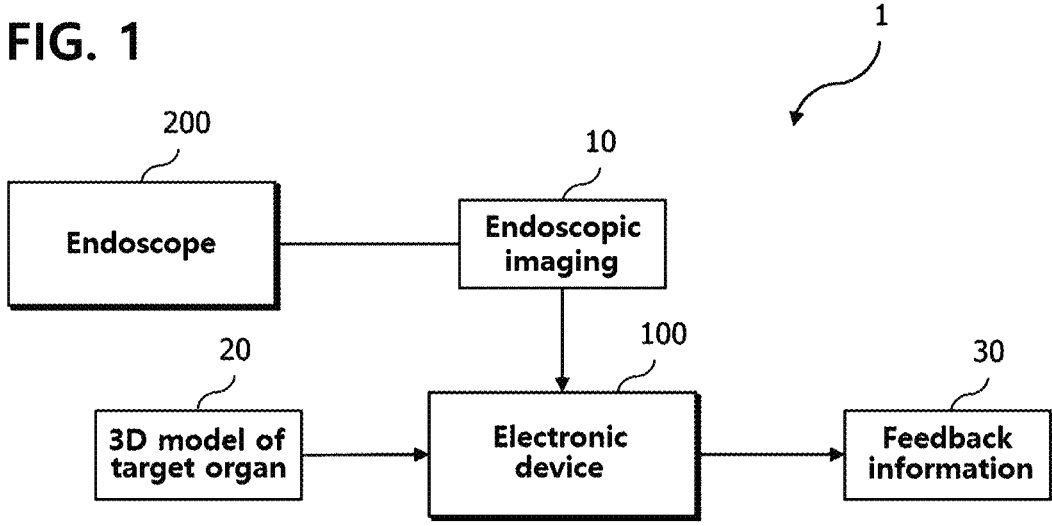
FIG. 1 is a schematic diagram illustrating an endoscopy examination system according to an exemplary embodiment of the present invention.

Hereinafter, preferred exemplary embodiments according to the present invention will be described in detail with reference to the accompanying drawings. The detailed description set forth below in conjunction with the accompanying drawings is intended to describe exemplary embodiments of the present invention and is not intended to represent the only exemplary embodiments in which the present invention may be practiced. In order to clearly describe the present invention in the drawings, parts that are irrelevant to the description may be omitted, and the same reference numerals may be used for the same or similar components throughout the specification.

FIG. 1 is a schematic diagram illustrating an endoscopy examination system according to an exemplary embodiment of the present invention.

The endoscopic examination system 1 of FIG. 1 includes an electronic device 100 and an endoscope 200. According to an exemplary embodiment of the present invention, the electronic device 100 is a device that performs endoscopic examination by using an endoscopic image 10 obtained by the endoscope 200 and provides feedback information 30 for the endoscopic examination, and it may be implemented as a computer, a server, a smart phone, a tablet PC, a smart pad, a laptop and the like.

According to an exemplary embodiment of the present invention, the endoscope 200 is a device that is inserted into the gastrointestinal tract of a subject to photograph target organs such as the stomach and large intestine, and collects/removes tissues, and depending on the type of the endoscope, it may mount a camera, a LIDAR and the like. The endoscope 200 of the present invention may be connected to the electronic device 100 through wired/wireless communication to provide the endoscopic image 10, and the type thereof is not limited to any one.

Meanwhile, as described above, in the case of endoscopic examination, the examination results thereof may vary depending on the proficiency of the examiner, physiological phenomena occurring during the endoscopic examination, vibration and the like.

In the present invention, the electronic device 100 uses a model 20 (hereinafter, referred to as a 3D model 20, and it may be provided in data form) in which the target organ is restored in 3D to identify the location information of the endoscope 200 on a 3D model 20 in real time, and proposes a method of providing feedback by distinguishing examination areas/unexamined areas of the 3D model 20.

According to an exemplary embodiment of the present invention, the examiner may check the examination quality of the endoscopy examination based on the feedback information 30 in real time or ex post facto to take appropriate measures.

Hereinafter, the configuration and operation of an electronic device according to an exemplary embodiment of the present invention will be described in detail with reference to the drawings.

Figure 2:
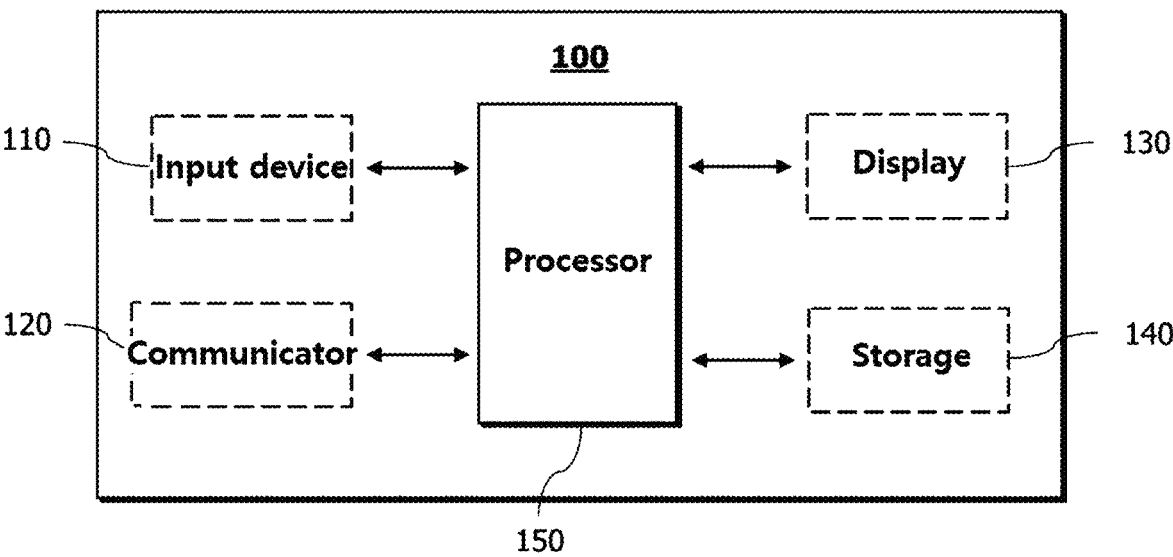
FIG. 2 is a block diagram illustrating the configuration of an electronic device according to an exemplary embodiment of the present invention.

FIG. 2 is a block diagram illustrating the configuration of an electronic device according to an exemplary embodiment of the present invention.

The electronic device 100 according to an exemplary embodiment of the present invention includes an input device 110, a communicator 120, a display 130, a storage 140 and a processor 150.

The input device 110 generates input data in response to a user input of the electronic device 100. For example, the user input may be a user input for starting the operation of the electronic device 100, a user input for setting threshold values that are necessary in the process of determining whether to undergo an examination and the like, and other than the above, in the case of a user input required to perform endoscopic examination, it is applicable without limitation.

The input device 110 includes at least one input means. The input device 110 may include a keyboard, a key pad, a dome switch, a touch panel, a touch key, a mouse, a menu button and the like.

The communicator 120 performs communication with external devices such as the endoscope 200 and a server to transmit and receive an endoscope image 10, a 3D model 20 and feedback information 30.

To this end, the communicator 120 may perform wireless communication such as 5th generation communication (5G), long term evolution-advanced (LTE-A), long term evolution (LTE), wireless fidelity (Wi-Fi), Bluetooth and the like, or wired communication such as local area network (LAN), wide area network (WAN), power line communication and the like.

The display 130 displays display data according to the operation of the electronic device 100. The display 130 may display a screen for displaying the endoscope image 10, a screen for displaying real-time location information of the endoscope 200 on the 3D model 20, a screen for displaying the feedback information 30 such as a 3D model 20 displaying examination areas and unexamined area, a screen for receiving a user input and the like.

The display 130 may include a liquid crystal display (LCD), a light emitting diode (LED) display, an organic LED (OLED) display, a micro-electro mechanical systems (MEMS) display and an electronic paper display. The display 130 may be combined with the input device 110 and implemented as a touch screen.

The storage 140 stores operating programs of the electronic device 100. The storage 140 includes non-volatile storage which is capable of preserving data (information) regardless of whether electric power is provided, and volatile memory in which data to be processed by the processor is loaded and it is not possible to retain data unless electric power is supplied. Examples of the storage include flash-memory, hard-disc drive (HDD), solid-state drive (SSD), read-only memory (ROM) and the like, and examples of the memory include buffer, random access memory (RAM) and the like.

The storage 140 may store the endoscopic image 10, the 3D model 20, the feedback information 30 and the like. The storage 140 may store arithmetic programs that are necessary in the process of constructing the 3D model 20, identifying location information of the endoscope 200, distinguishing an examination area/candidate examination area/unexamined area and the like.

The processor 150 may execute software such as a program to control at least one other component (e.g., a hardware or software component) of the electronic device 100 and perform various data processing or calculations.

The processor 150 according to an exemplary embodiment of the present invention may obtain an endoscopic image 10 and a 3D model 20 of the target organ, identify location information of the 3D model 20 in real time based on simultaneous localization and mapping (SLAM), classify a plurality of areas constituting the 3D model 20 into examination areas and unexamined areas by using the endoscopic image 10 and the location information, and provide feedback information 30 based on the examination areas and unexamined areas.

The processor 150 according to an exemplary embodiment of the present invention may use a model which is learned to determine whether the examination is performed, in the process of classifying a plurality of areas constituting the 3D model 20 into examination areas and unexamined areas.

In this case, the processor 150 may train a simultaneous localization and mapping algorithm and/or a model for determining whether the examination is performed, or may use a pre-learned generated model by receiving and storing from the outside, and it is not limited to any one.

Meanwhile, the processor 150 may perform at least some of data analysis, processing and result information generation for performing the above operations by using at least one of machine learning, neural network or deep learning as a rule-based or artificial intelligence algorithm. Examples of the neural network may include models such as a convolutional neural network (CNN), a deep neural network (DNN), and a recurrent neural network (RNN).

Figure 3:
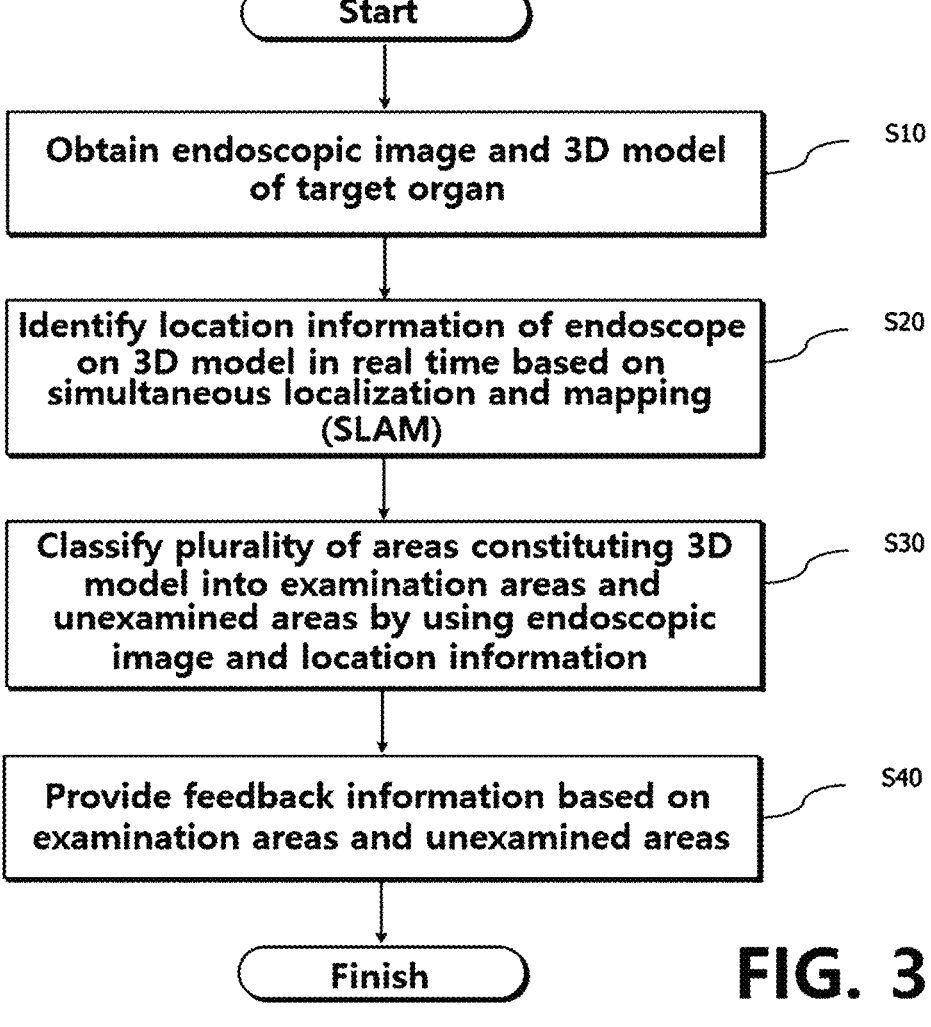
FIG. 3 is a diagram illustrating the operation flowchart of an electronic device according to an exemplary embodiment of the present invention.

FIG. 3 is a diagram illustrating the operation flowchart of an electronic device according to an exemplary embodiment of the present invention.

According to an exemplary embodiment of the present invention, the processor 150 may acquire the endoscopic image 10 and the 3D model 20 of the target organ (S10).

According to an exemplary embodiment of the present invention, 3D model data for a target organ is required to confirm the accuracy of endoscopic examination, and the 3D model may be obtained through various methods.

For example, the processor 150 may construct the 3D model 20 in real time by using the endoscopic image 10 based on simultaneous localization and mapping (SLAM).

Simultaneous localization and mapping is an algorithm that creates a map of the surrounding environment of the endoscope 200 while measuring the location of the endoscope 200. The process of generating a learning model for simultaneous localization and mapping by the processor 150 according to an exemplary embodiment of the present invention will be described with reference to FIG. 4.

Meanwhile, in addition to simultaneous localization and mapping (SLAM), the processor 150 acquire or construct a 3D model 20 which is generated based on any one of SfM (Structure from Motion), MvS (Multi-view Stereo), CT (Computed Tomography) and a 3D sensor. Meanwhile, restoration by SfM, MvS, CT and a 3D sensor is non-real-time restoration, but more precise restoration is possible through pre-established data on test subjects.

According to an exemplary embodiment of the present invention, the processor 150 may identify location information of the endoscope 200 on the 3D model in real time based on simultaneous localization and mapping (SLAM) (S20).

According to an exemplary embodiment of the present invention, the processor 150 extracts features from the endoscope image 10, calculates the motion of the endoscope 200 (camera) in real time, and identifies location information in real time by using the calculated motion.

In this case, when the processor 150 uses a 3D model (hereinafter, referred to as a 3D model 1) which is constructed on the basis of simultaneous localization and mapping, it is easy to identify positional information of the endoscope 200 on the 3D model 1 again based on simultaneous localization and mapping. This is because the 3D model creation and location information identification are performed based on the same technology, and the data format or data processing method is the same.

On the other hand, when the processor 150 uses a 3D model (hereinafter, referred to as a 3D model 2) which is restored by SfM, MvS, CT and a 3D sensor, it is necessary to match the 3D model 2 to the simultaneous localization and mapping algorithm.

Accordingly, the processor 150 may generate the 3D model 1 in real time and perform registration process between the 3D model 1 and the 3D model 2. In this case, the processor 150 may generate at least a part of the 3D model 1, and may be composed of a 2D image (referred to as a 2D image 1). Hereinafter, for the convenience of description, the case of the 3D model 1 will be described, but it is certain that it may be applied not only between the 3D model 1 and the 3D model 2, but also between the 2D image 1 and the 3D model 2.

Specifically, in order to register the 3D model 1 and the 3D model 2, the processor 150 may extract features of the 3D model 1 and the 3D model 2, respectively. In this case, the processor 150 may use an algorithm for extracting features of the models, for example, a Scale-Invariant-Feature Transform (SIFT) algorithm, a Speeded Up Robust Features (SURF) algorithm and the like. However, the present invention is not limited thereto, and any algorithm which is capable of extracting features of models may be employed without limitation.

Next, the processor 150 matches the features of the identified 3D model 1 and 3D model 2 to find the optimal transformation for aligning the 3D model 1 and the 3D model 2. To this end, the processor 150 may use methods such as iterative closest point (ICP) and random sample consensus (RANSAC).

Additionally, for higher quality of registration, the processor 150 may use an algorithm that minimizes a feature difference between the 3D model 1 and the 3D model 2. For example, the processor 150 may minimize a feature difference between the 3D model 1 and the 3D model 2 by using a gradient descent method or the Levenberg Marquardt algorithm.

When the registration is completed, the processor 150 may visualize the result in real time, and the 3D model 1 may be overlaid on the 3D model 2 to display the missing area, thereby guaranteeing complete coverage.

According to an exemplary embodiment of the present invention, the processor 150 uses the endoscopic image 10 and location information to distinguish a plurality of areas constituting the 3D model 20 as areas for which the examination has been completed (hereinafter, referred to as examination areas) and unexamined areas (S30).

Specifically, the processor 150 may identify candidate examination areas among a plurality of areas of the 3D model 20 based on the location information.

According to an exemplary embodiment of the present invention, the 3D model 20 may be composed of a plurality of areas. In this case, the plurality of areas may be voxels obtained by voxeling the 3D model 20 to a certain volume or may be areas (two-dimensional) obtained by dividing the internal mucous membrane of the target organ into certain sizes, and it is limited to any one.

However, even in areas captured by the endoscope 200, there may be areas that are not properly examined due to various factors. Accordingly, the processor 150 according to an exemplary embodiment of the present invention views the area photographed by the endoscope 200 as a candidate examination area, and determines whether the examination has been performed for each of the candidate examination areas, thereby confirming whether the examination has actually been performed.

According to an exemplary embodiment of the present invention, it is possible to determine whether the examination is performed by using predetermined reference information. The reference information may include the importance of each area of the 3D model, an observation time for each area and the quality of an endoscopic image.

In addition, the processor 150 may classify the plurality of areas into examination areas and unexamined areas based on the determination result.

For example, the processor 150 may determine whether the examination is performed by considering the importance of each area of the 3D model 20. For target organs, the main locations of occurrence of lesions may be known through already derived research results. The processor 150 may set a weight for the importance of each area through a user input or may receive information on the importance of each area that is set based on known research results. In addition, the present invention is not limited thereto, and the processor 150 may set weights by using an artificial intelligence model having learned weights according to areas of the 3D model.

In addition, the processor 150 may determine whether the examination is performed by considering an observation time for each area. Even if a specific area is identified as a candidate examination area based on the location information of the endoscope 200, it is difficult to consider that precise examination has been performed if the area is passed in a very short period of time.

Accordingly, the processor 150 may determine whether the observation time for each candidate examination area exceeds a threshold value, and may identify the examination area as an examination area if the observation time exceeds the threshold value, and as an unexamined area if it does not exceed the threshold value. In this case, the threshold value for the observation time may be set by the user as well, and it may be set through a model learned therefrom. Alternatively, there is no limitation on the method, such as determining based on the number of image frames for the same area.

In addition, the processor 150 may determine whether the examination is performed in consideration of the quality of the endoscopic image 10. Even if it is identified as a candidate examination area, if the quality of the endoscopic image is low due to sharpness or distortion, such as when the endoscope 200 is shaken when photographing the area, it is difficult to consider that an accurate examination has been similarly performed. In addition, if a lesion such as a polyp is found in the endoscopic image 10, but it is difficult to accurately determine the distance from the polyp, the corresponding area may be determined as an unexamined area.

In this way, the processor 150 evaluates the quality of each image, and when the criterion is lower than the threshold, the corresponding candidate examination area may be determined as an examination area or an unexamined area.

Meanwhile, the processor 150 may determine whether each candidate examination area has been examined by combining two or more pieces of information among the reference information. For example, even when the observation time of a specific candidate examination area is lower than the threshold value, if it is an area in which the probability of finding a lesion in the target organ is extremely low (when the weight for the corresponding area is low), the processor 150 may determine this as an examination area. As another example, even when the observation time of a specific candidate examination area is lower than the threshold value, if it is determined that the presence or absence of a lesion can be determined because the quality of the image is high, the processor 150 may determine this as an examination area.

According to an exemplary embodiment of the present invention, the processor 150 may use a model which is learned to determine whether the examination is performed based on at least one of the importance of each area of the 3D model, an observation time for each area and the quality of the endoscopic image so as to determine whether the examination is performed.

According to an exemplary embodiment of the present invention, the processor 150 may provide feedback information based on the examination areas and the unexamined areas (S40).

Figure 5:
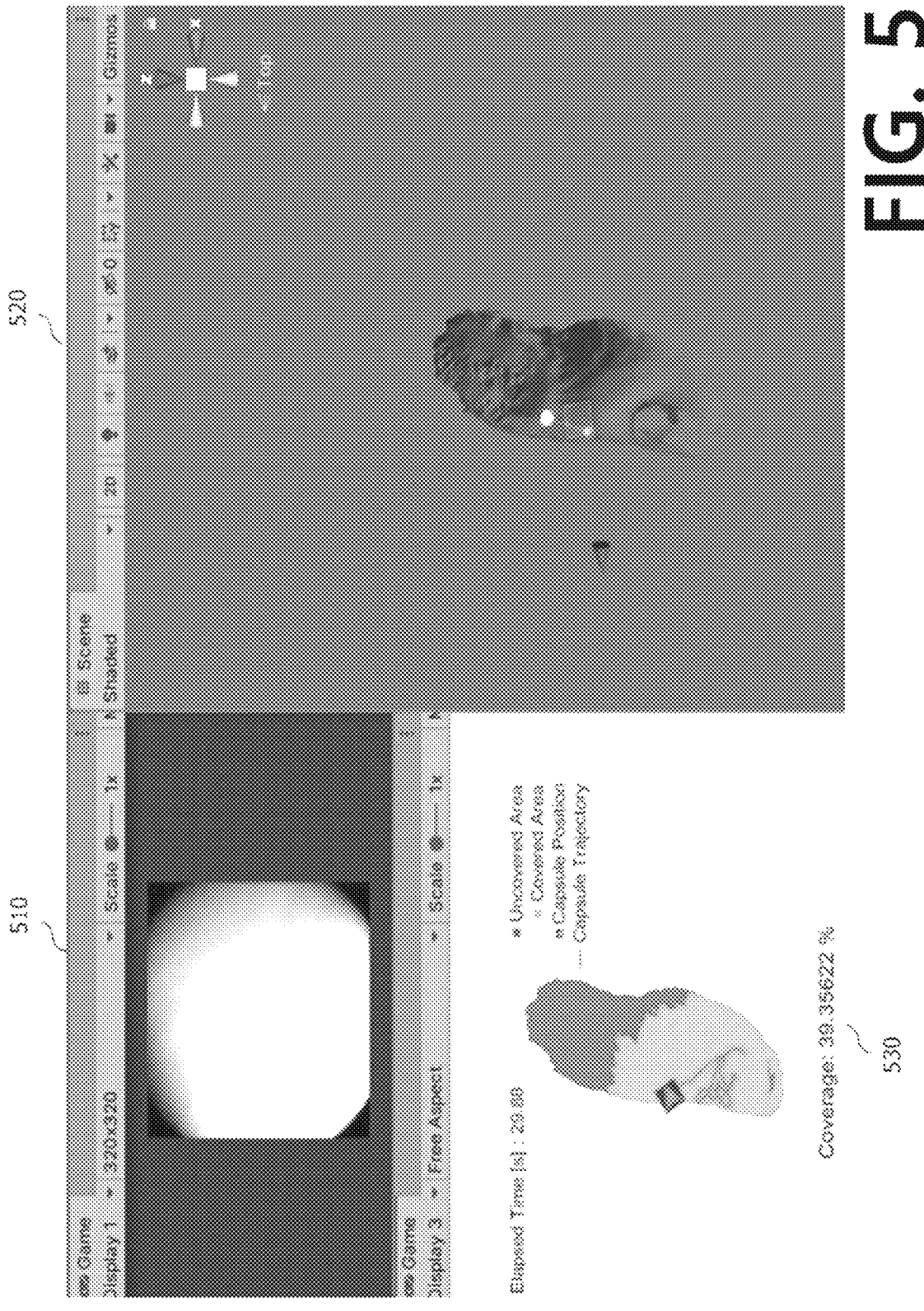
FIG. 5 is a diagram illustrating how the feedback information is provided according to an exemplary embodiment of the present invention.

The feedback information is information by which the examiner can determine the appropriateness of the endoscopy examination, and it may include examination time, information on the current location of the endoscope 200, information on the examination progress rate, a 3D model displaying the examination area/unexamined area separately, information for confirming an unexamined area, information about an endoscope path for moving to an unexamined area in real time and the like. An example of feedback information is illustrated in FIG. 5.

According to an exemplary embodiment of the present invention, the endoscopic examination area/unexamined area may be identified in comparison to the entire area, thereby increasing a lesion detection rate in endoscopic examination and minimizing a lesion overlook rate.

According to an exemplary embodiment of the present invention, it is possible to provide a highly reliable endoscope precision examination service regardless of the skill level of an examiner.

According to an exemplary embodiment of the present invention, when the ratio of the examination area to the total area is low or the area of high importance is overlooked by referring to the feedback information, the examiner takes follow-up measures such as performing re-examination, thereby increasing the tumor detection rate through endoscopic examination.

Figure 4:
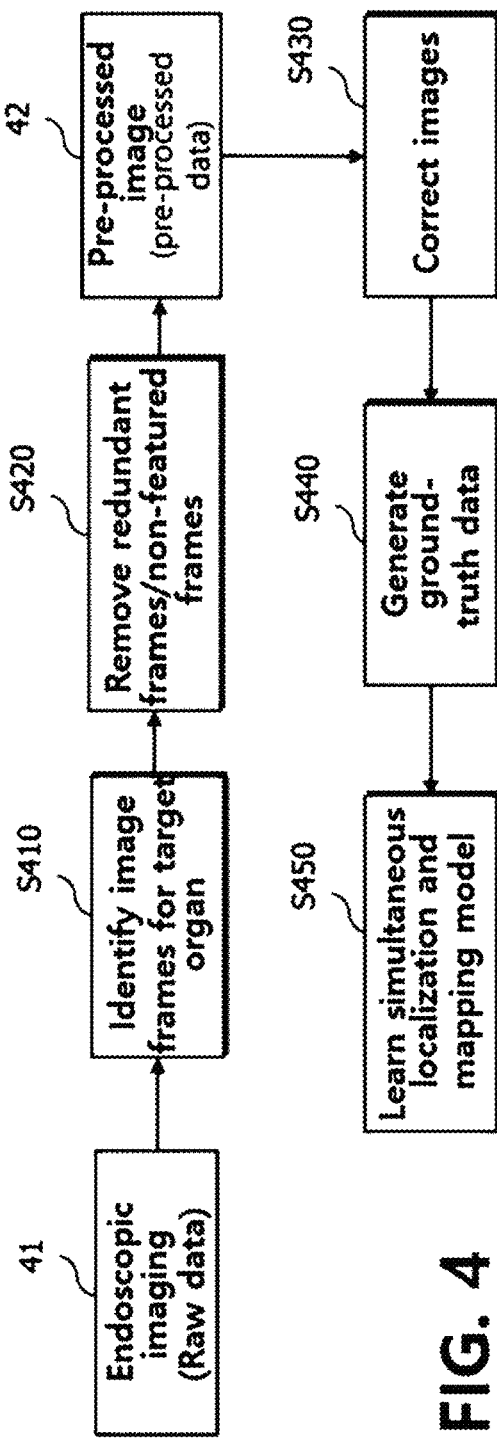
FIG. 4 is a diagram illustrating the operation flowchart of learning a model for simultaneous localization and mapping according to an exemplary embodiment of the present invention.

FIG. 4 is a diagram illustrating the operation flowchart of learning a model for simultaneous localization and mapping according to an exemplary embodiment of the present invention.

First of all, the processor 150 may extract image frames (Region of Interest, ROI) of a target organ from raw data of the endoscopic image 410 received from the endoscope 200 (S410). In this case, the processor 150 may extract image frames of the target organ after extracting RGB frames from raw data.

Thereafter, the processor 150 may remove redundant image frames, such as no movement between consecutive frames, and image frames without features among the image frames of the target organ (S420).

According to an exemplary embodiment of the present invention, the processor 150 may use an algorithm for extracting features of image frames, for example, the Scale-Invariant-Feature Transform (SIFT) algorithm, in order to distinguish featureless image frames. However, the present invention is not limited thereto, and any algorithm which is capable of distinguishing image frames by learning the features of a target organ may be adopted without limitation.

Next, the processor 150 may correct a pre-processed image (pre-processed data) 42 (S430). The processor 150 may use a checkerboard pattern that is recorded by the camera sensor of the endoscope 200 to identify a correction parameter, and correct the distortion of an image by using the correction parameter. In addition to the above, the processor 150 may correct an image through various correction methods that are capable of enhancing the quality of the image, such as correcting the sharpness of the preprocessed image 42.

Next, the processor 150 may generate ground-truth data (S440). Ground-truth data may be generated in various ways, and for example, it may be generated by using SfM through a dense descriptor learning method.

Finally, the processor 150 may learn a simultaneous localization and mapping model by using the ground-truth data (S450).

For the simultaneous localization and mapping model, two separate networks may be used to learn geometry and appearance representations.

For shapes, the depth network produces an average depth estimate, and for shapes, the feature network creates a descriptor map and a feature map.

FIG. 5 is a diagram illustrating how the feedback information is provided according to an exemplary embodiment of the present invention.

FIG. 5 is composed of a screen 510 for displaying an endoscope image, a screen 520 for displaying a 3D model and a screen 530 for displaying feedback information. In this case, the design of the screens or displayed information is not limited to the example illustrated in FIG. 5.

Looking specifically at the screen 530 for displaying the feedback information, an examination area (covered area) and an unexamined area (uncovered area) are displayed to be distinguished in a 3D model (or a corresponding 2D model), and the examination time (elapsed time), coverage rate, current position of the endoscope (capsule position) and information including the movement path of the endoscope (capsule trajectory) are displayed.

In this case, the processor 150 may display endoscopic images or feedback information in real time, or may display recorded or previously recorded (stored) information ex post facto.

According to an exemplary embodiment of the present invention, by visually providing feedback information, the examiner may easily perform follow-up measures, and through this, the lesion overlook rate may be effectively reduced.

Figure 6:
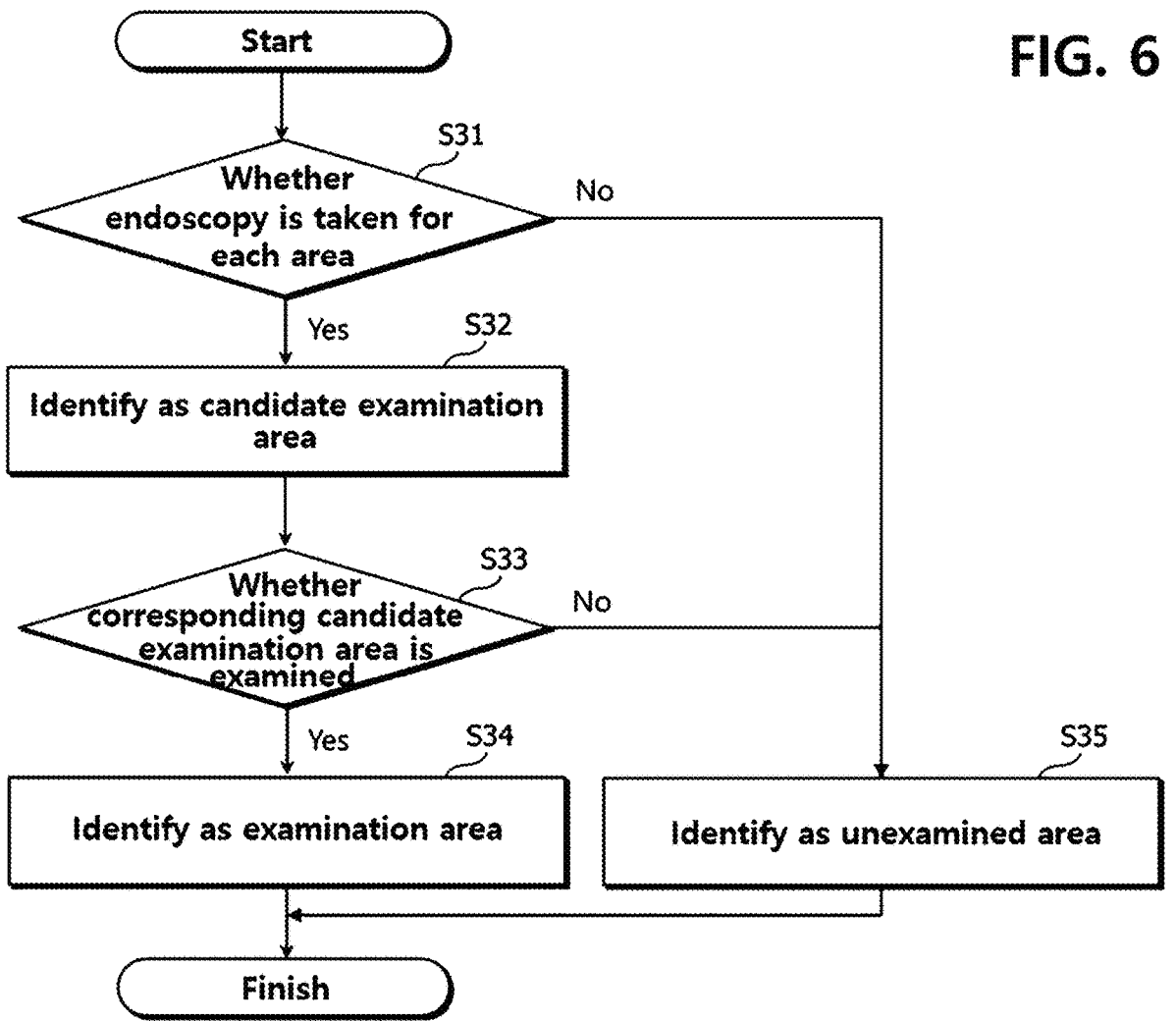
FIG. 6 is a flowchart illustrating the operation flowchart of identifying an examination area and an unexamined area by an electronic device according to an exemplary embodiment of the present invention.

FIG. 6 is a flowchart illustrating the operation flowchart of identifying an examination area and an unexamined area by an electronic device according to an exemplary embodiment of the present invention.

As described in relation to S30 of FIG. 3, FIG. 6 specifically describes the process of classifying a plurality of areas into an examination area and an unexamined area according to whether the examination has been performed. Therefore, for the overlapping parts, the contents described with reference to FIG. 3 will be referenced, and the specific contents will be omitted.

According to an exemplary embodiment of the present invention, the processor 150 may identify whether the endoscope 200 has taken images for each of a plurality of areas (S31). The processor 150 may determine whether to photograph based on location information of the endoscope 200 that is obtained based on simultaneous localization and mapping.

When it is identified that the endoscope 200 has photographed the corresponding area (Yes in S31), the processor 150 may identify the corresponding area as a candidate examination area (S32). If it is not identified that the endoscope 200 has photographed the corresponding area (No in S31), the corresponding area may be identified as an unexamined area (S35).

According to an exemplary embodiment of the present invention, the processor 150 may identify whether an examination has been performed for each of the candidate examination areas (S33).

For the method of determining whether the examination is performed, refer to FIG. 3.

When the processor 150 identifies that the candidate examination area has been examined (Yes in S33), the processor 150 may identify the corresponding area as the examination area (S34). If the processor 150 identifies the candidate examination area as not being examined (No in S33), it may identify the corresponding area as an unexamined area (S35).

According to an exemplary embodiment of the present invention, it is possible to further lower the lesion overlook rate by determining whether the examination is performed in detail for each area.

The present invention is the result of a research project according to the following project information.

[Research Project Number] ZC22RISI0962
[Research Title] Real-time 3D reconstruction based on endoscopic image for quality improvement of gastrointestinal endoscopy
[Research Support Project] 2022 Seoul St. Mary's Hospital Creative Research Support Project
[Research Director] LEE Bo-in
[Affiliation] Department of Gastroenterology, Seoul St. Mary's Hospital
[Research Support Organization] The Catholic University of Korea—Songeui
[Research Period] Nov. 1, 2022 to Oct. 31, 2023

EXPLANATION OF REFERENCE NUMERALS

100: Electronic device
110: Input device
120: Communicator
130: Display
140: Storage
150: Processor
200: Endoscope

The invention claimed is:

1. A method for performing endoscopic examination, comprising the steps of:
   obtaining an endoscopic image and a 3D model of a target organ;
   identifying location information of an endoscope on the 3D model in real time based on simultaneous localization and mapping (SLAM);
   classifying a plurality of areas constituting the 3D model into examination areas and unexamined areas by using the endoscopic image and the location information; and
   providing feedback information based on the examination areas and the unexamined areas,
   wherein the step of classifying comprises the steps of:
      identifying candidate examination areas among the plurality of areas of the 3D model based on the location information;
      determining whether an examination is performed for each of the candidate examination areas; and
      classifying the plurality of areas into the examination areas and the unexamined areas based on the determination result,
   wherein the step of determining comprises a step of determining whether the examination is performed based on at least one of an importance of each area of the 3D model, an observation time for the each area and the quality of the endoscopic image.

2. The method of claim 1, wherein the step of obtaining comprises a step of constructing the 3D model in real time by using the endoscopic image based on simultaneous localization and mapping (SLAM).

3. The method of claim 1, wherein the step of obtaining comprises a step of obtaining the 3D model generated based on any one of SfM (Structure from Motion), MvS (Multi-view Stereo), CT (Computed Tomography) and a 3D sensor.

4. The method of claim 3, wherein the step of obtaining comprises the steps of:
   constructing a first 3D model in real time by using the endoscopic image based on the simultaneous localization and mapping; and
   obtaining the 3D model by registering a second 3D model generated based on any one of SfM (Structure from Motion), MvS (Multi-view Stereo), CT (Computed Tomography) and a 3D sensor with the first 3D model.

5. The method of claim 4, wherein the method further comprises:
   extracting features of the first 3D model and the second 3D model; and
   registering the first 3D model and the second 3D model by matching the extracted features.

6. The method of claim 1, wherein the step of determining comprises a step of determining whether the examination is performed by using a model which is learned to determine whether the examination is performed based on at least one of the importance of the each area of the 3D model, the observation time for the each area and the quality of the endoscopic image.

7. The method of claim 1, wherein the step of providing comprises a step of providing at least one of information about the examination path of the endoscope and information about the unexamined areas.

8. An electronic device which is interlinked with an endoscope to perform endoscopic examination, comprising
   a processor configured to obtain an endoscopic image and a 3D model of a target organ, identify location information of an endoscope on the 3D model in real time based on simultaneous localization and mapping (SLAM), classify a plurality of areas constituting the 3D model into examination areas and unexamined areas by using the endoscopic image and the location information, and provide feedback information based on the examination areas and the unexamined areas,
   wherein the processor is configured to identify candidate examination areas among the plurality of areas of the 3D model based on the location information, determine whether an examination is performed for each of the candidate examination areas, and classify the plurality of areas into the examination areas and the unexamined areas based on the determination result,
   wherein the processor is configured to determine whether the examination is performed based on at least one of an importance of each area of the 3D model, an observation time for the each area and the quality of the endoscopic image.

9. The electronic device of claim 8, wherein the processor is configured to construct the 3D model in real time by using the endoscopic image based on simultaneous localization and mapping (SLAM).

10. The electronic device of claim 8, wherein the processor is configured to obtain the 3D model generated based on any one of SfM (Structure from Motion), MvS (Multi-view Stereo), CT (Computed Tomography) and a 3D sensor.

11. The electronic device of claim 10, wherein the processor is configured to construct a first 3D model in real time by using the endoscopic image based on the simultaneous localization and mapping, and obtain the 3D model by registering a second 3D model generated based on any one of SfM (Structure from Motion), MvS (Multi-view Stereo), CT (Computed Tomography) and a 3D sensor with the first 3D model.

12. The electronic device of claim 11, wherein the processor is configured to extract features of the first 3D model and the second 3D model, and register the first 3D model and the second 3D model by matching the extracted features.

13. The electronic device of claim 8, wherein the processor is configured to determine whether the examination is performed by using a model which is learned to determine whether the examination is performed based on at least one of the importance of the each area of the 3D model, the observation time for the each area and the quality of the endoscopic image.

14. The electronic device of claim 8, wherein the processor is configured to provide at least one of information about the examination path of the endoscope and information about the unexamined areas.

\*   \*   \*   \*   \*